May 22, 1934.  P. R. GLASS  1,959,579
STARTING AND STOPPING MECHANISM
Original Filed April 15, 1927
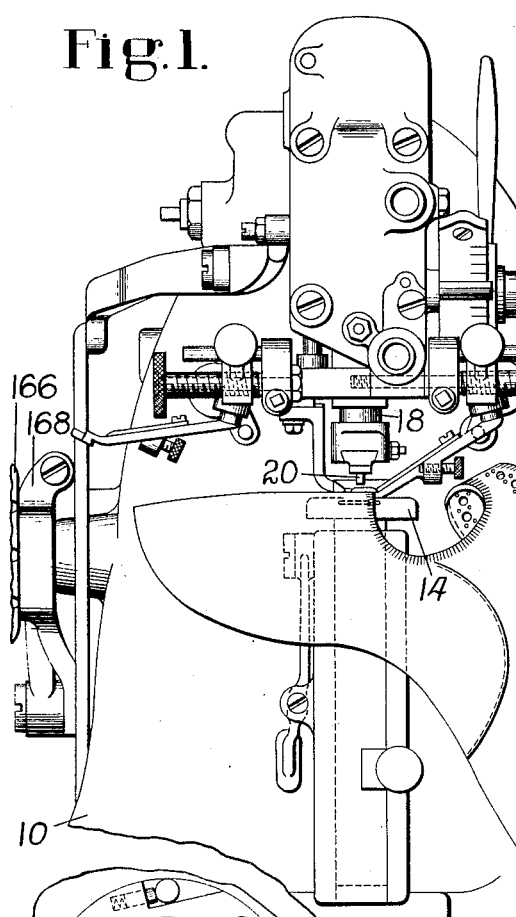
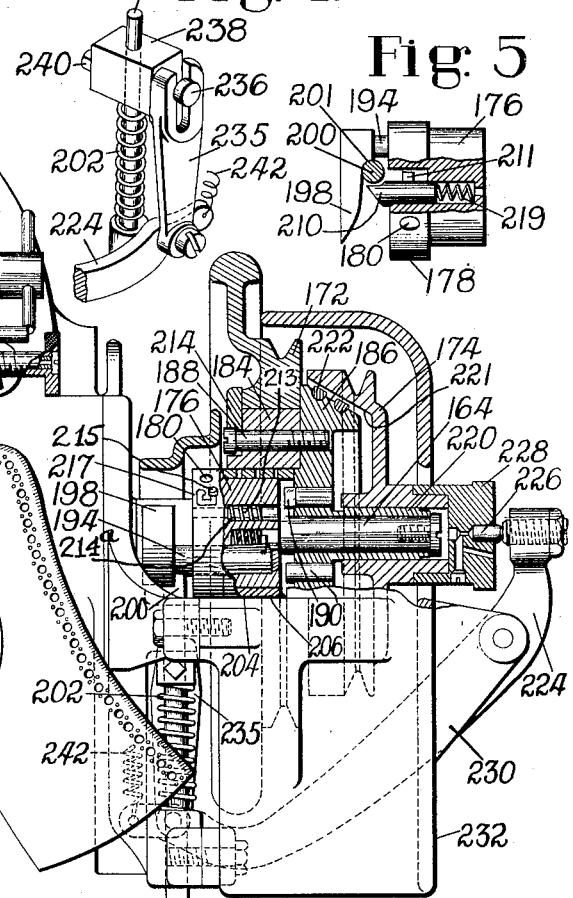
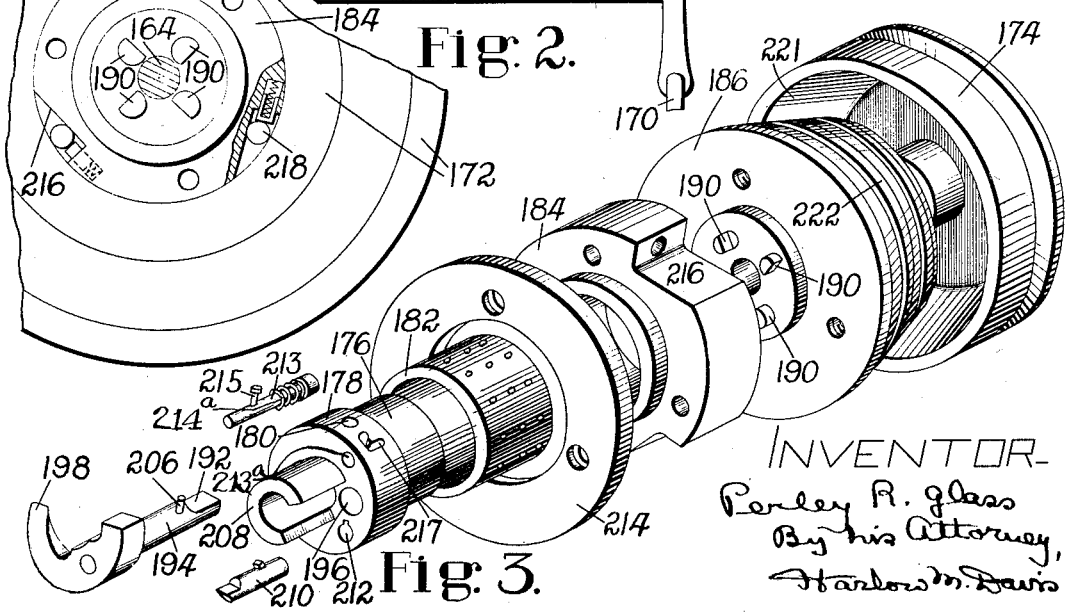
INVENTOR-
Perley R. Glass
By his Attorney,
Harlow M. Davis Patented May 22, 1934

1,959,579

UNITED STATES PATENT OFFICE 1,959,579

STARTING AND STOPPING MECHANISM

Perley R. Glass, Wayland, Mass., assignor to United Shoe Machinery Corporation, Paterson, N. J., a corporation of New Jersey Original application April 15, 1927, Serial No. 184,114. Divided and this application November 17, 1930, Serial No. 496,313

9 Claims. (Cl. 192—146)

This invention relates to starting and stopping mechanisms and is herein illustrated as embodied in a machine for perforating parts of boots and shoes for ornamental purposes. The illustrated machine is disclosed in an application for Letters Patent of the United States Serial No. 184,114, filed April 15, 1927, on which Patent No. 1,799,615, dated April 7, 1931, has been granted and of which the present application is a division.

The invention is not limited to the above type of perforating machine but may be embodied in other perforating machines or in various types of machines which require to be started and stopped frequently and which are operated at different speeds according to the varying characteristics of the work being operated upon at any particular instant. In the use of perforating and other machines upon shoe parts or other work pieces having both relatively sharply curved portions and other portions which are straight or less sharply curved, it is desirable to drive the machine at a comparatively slow speed in passing around the more sharply curved portions of the work in order that the operator may have time to guide the work around such contour and to drive it at a higher speed when passing along relatively straight portions of the work where it is easier to guide the work to the operating instrumentalities.

It is an object of this invention to provide an improved starting and stopping mechanism which will be more positive in its operation and of durable construction, and by means of which a work performing machine may be driven at different speeds with a minimum of effort on the part of the operator in order that it may be adapted to satisfy requirements such as those above set forth.

With the above object in view, the driving shaft of the illustrated mechanism carries pulleys, which are driven at different speeds, and which are, conveniently, of different sizes. In the illustrated mechanism, a pin clutch is provided for connecting the slow speed pulley positively to the driving shaft of the machine upon partial depression of the treadle, further depression of the treadle being effective to connect the higher speed pulley to the driving shaft of the machine, whereupon an interposed over-running roller clutch disengages the slow speed pulley from a shaft and permits the shaft to run at a higher speed than that of the slow speed pulley. Preferably, a friction clutch is used to connect the higher speed pulley to the shaft so that the speed may be controlled by the operator by varying the pressure on the treadle and consequently the friction and slippage between the clutch members. The speed may, at any time, be reduced to the slow speed by releasing the treadle enough to disconnect the high speed pulley from the shaft without disconnecting the slow speed pulley. After such reduction in speed, subsequent increase in speed may be obtained upon reconnecting the friction clutch by again depressing the treadle beyond the point where the slow speed is obtained. As illustrated, upon entire release of the treadle, both the high and slow speed pulleys are disconnected successively from the driving shaft, and the driving shaft is stopped at a predetermined point in the cycle of operations by portions of the pin clutch mechanism, which then act as a stopping mechanism. Preferably, a novel latch mechanism is provided to lock the machine against rebound after it is stopped.

As illustrated also a friction brake mechanism is provided which is in engagement with the shaft at all times and rapidly slows down the machine to the speed of the slow speed pulley when the high speed mechanism is thrown out of action. It similarly assists in slowing down the shaft, after the slow speed pulley has been disconnected, preparatory to stopping it in a definite position. It thus acts to decelerate the shaft as soon as any driving power is disconnected therefrom. The brake is preferably adjustable to allow a deceleration suitable for the work being performed by the machine and the skill of the operator.

In the drawing,

Fig. 1 is a front elevation of a perforating machine in which is embodied the starting and stopping mechanism of the present invention, with certain parts of said mechanism shown in section;

Fig. 2 is a side elevation of a portion of the clutch mechanism, with parts broken away;

Fig. 3 is an exploded view of the principal parts of the starting and stopping mechanism that are mounted on the driving shaft of the machine;

Fig. 4 is a fragmentary perspective of part of the treadle rod from the rear; and Fig. 5 is a bottom view of part of the pin clutch.

The perforating machine illustrated in Fig. 1 is of the type employing a four-motion feed punch supported in an overhanging arm and arranged to feed the work, positioned on a work support carried by a co-operating lower arm, in a path extending away from the operator in line with the overhanging arm. This machine comprises, essentially, a frame 10 having a work support 14 carried by the lower arm and a punch bar 18 carried by the overhanging arm and provided at its lower end with a replaceable punch 20.

The machine is provided with a drive shaft 164 having a hand wheel 166 at its left-hand end (Fig. 1) for turning the shaft slowly by hand when it is desired to make adjustments in the machine. An adjustable friction brake 168 is applied to the shaft adjacent to the hand wheel 166. This brake causes the speed of the machine to be decelerated rapidly as soon as any driving power is disconnected from the shaft. In order that the shaft may be driven at a relatively slow speed when starting the machine or when it is desired to operate around a relatively sharp curve of the work, the arrangement is such that, upon the depression of a suitable treadle rod 170, power will be supplied from a power shaft, not shown, through a slow speed pulley 172 and so that, upon further depression of the treadle rod 170, power will be supplied through a smaller and higher speed pulley 174, the slow speed pulley 172 being then automatically disconnected from the shaft (in a manner to be described) to allow the shaft to run at a higher speed than that of the slow speed pulley. To this end, the driving mechanism is provided with a collar 176, having an enlarged portion 178, rigidly held in position upon the drive shaft 164 by means of a pin 180. A sleeve 182, perforated to facilitate lubrication, surrounds the collar 176 and forms a bearing for a ring-shaped member 184 and also forms a spacer to position a cone clutch member 186, said members being rigidly secured together by means of a plurality of screws 188. It will be observed that the cone member 186 is provided with flattened pins 190 which are arranged for engagement with the flattened face 192 of a sliding clutch pin 194, which is slidably mounted within a hole 196 in the collar 176, and which is provided with a wedge-shaped member 198 at its outer end for engagement by a vertical slide rod 200 connected to the treadle rod 170. The rod 200 is surrounded by a spring 202 by means of which it is normally held in elevated position in the path of movement of the wedge-shaped member 198 and a spring 204 (Fig. 1) seated in a recess of the collar 176 is arranged to bear against a pin 206 secured in the side of the sliding pin 194, the arrangement being such that, when the treadle is depressed, the spring 204 pushes the sliding clutch pin 194 to the right in Fig. 1 into engagement with one of the clutch pins 190. At the same time, the wedge-shaped member 198 comes against the outer end of the enlarged portion 178 of the collar 176. It should be observed that the collar 176 is also provided with an outwardly extending partially annular member 208 which engages the wedge-shaped member 198 to prevent its rotation with respect to the collar 176 without interfering with axial sliding movement with respect thereto.

Thus, upon the initial partial depression of the control treadle, the rod 200 is withdrawn to allow the clutch pin 194 positively to contact with one of the flattened pins 190 in the cone clutch member 186. As the clutch pin 194 is carried by the collar 176, which is secured to the shaft 164, a driving connection is thus established, by the engagement of the clutch pin 194 with one of the pins 190 in the member 186 and the screws 188 connecting said member with the ring member 184, between the ring member 184 and the shaft 164. This, as will later be explained, results in providing a positive driving connection between the slow speed pulley 172 and the shaft 164 to rotate the machine at a suitable and convenient speed for those portions of the work requiring care. The pin clutch construction just described also provides an arrangement by means of which the machine may be stopped at a predetermined point in its cycle of rotation when the control treadle has been released. When this happens and the vertical rod 200 is pushed upwardly to engage the wedge-shaped member 198 and cause it to withdraw the clutch pin 194 out of contact with the pin 190 with which it has been in engagement, the machine is positively stopped by reason of the engagement of said rod 200 in a notch 201 (Fig. 5) in the wedge 198. In order that there may be no rebound of the machine, a flattened latch pin 210, having a projection 211 to prevent its rotation and being beveled at its outer end, is mounted in a hole 212 in the collar 176 and is pressed outwardly by a spring 219 so as to snap behind the upper end of the vertical rod 200, thereby to prevent even a partial rotation of the machine in the opposite direction.

When it is desired to turn the machine over by hand, using the hand wheel 166, this operation may be safeguarded by sliding a locking plunger 213 (Fig. 3) (normally spring-pressed inwardly by the spring 214a) to the left so that its end will project through the hole 213a in the enlarged portion 178 of the collar 176 and will contact with the base of the wedge 198, effectively preventing engagement of the clutch pin 194 with any of the pins 190. The locking plunger may be held in this projecting position by turning its operating handle 215 to the top of the L-shaped slot 217.

In order that the slow speed pulley 172 may be effective, on the initial depression of the treadle, to drive the shaft 164 through the pin clutch just described, a roller clutch is provided between the inside bore of the pulley 172 and the ring member 184 upon which the pulley is mounted. The roller clutch is formed by providing tapered recesses 216 on the outer surface of the ring member for the reception of spring-pressed rolls 218 (Fig. 2) which engage the inside bore of the pulley 172 and provide a one-way or over-running clutch connection between the pulley 172 and the ring member 184 at all times. The pulley 172 will thus drive the ring member 184 through this connection and, when the pin clutch is engaged, the motion of the ring member will be communicated, through the screws 188, the cone clutch member 186, one of the pins 190, the clutch pin 194, the collar 176 and the pin 180, to drive the shaft 164. However, when the shaft 164 is driven faster than the pulley 172, (as will later be described) the clutch rolls 218 will become disengaged and the slow speed pulley will offer no resistance to the faster moving shaft 164. The pulley 172 is held against lateral displacement upon the outer surface of the ring 184 by means of a plate 214 which is secured in position upon said ring member by the same screws 188 that clamp the ring member and the cone 186 together.

The smaller, faster moving pulley 174, having a conical inner face 221, is freely rotatable upon a sleeve extension 220 of the cone clutch member 186 and is arranged to be moved laterally along said extension 220, to engage friction rings 222 upon the outer surface of the cone 186, by means of a lever 224 engaging a pin 226 in a cap 228 on the hub of said pulley 174. The lever 224 is pivoted upon a bracket 230 extending outwardly from a protective casing 232 and at its other end is pivoted to an upright arm 235 (Fig. 4), the upper end of which is slotted for engagement with a stud 236 which is provided upon a block 238 secured, by a set screw 240, to the vertical rod 200. This end of the lever 224 is normally held in elevated position by means of a spring 242 so that the pulley 174 is normally out of engagement with the cone 186. When, in the action of depressing the treadle, the stud 236 upon the vertical rod 200 seats in the bottom of the slot at the upper end of the arm 235, the lever 224 will thereupon also be depressed at its lower end and will act to throw the pulley 174 into engagement with the cone clutch member 186, thereby to drive the shaft at a higher speed. There will be no interference with this action by reason of the slower movement of the pulley 172, because of the presence of the over-running roller clutch which allows this slower moving pulley to run free at a speed slower than the shaft 164, as hereinbefore explained. Thus, not only is the pulley positively connected to the shaft to drive it at a relatively slow speed, but it will be seen further, that a substantial movement of the treadle rod 170 is necessary in order to initiate a movement of the lever 224 by means of which the high speed pulley 174 will be connected to the shaft to drive the same at a higher speed. As a result there is no tendency of the mechanism to vacillate between one speed and another with a consequent wear upon the clutches provided. The arrangement also requires a minimum of skill upon the part of the operator in operating the control treadle.

The operation of this starting and stopping mechanism will now be summarized. Upon depression of the treadle connected to the treadle rod 170, the rod 200 will release the wedge 198 and allow the clutch pin 194 to engage one of the pins 190 and start the machine operating at the speed of the slow speed pulley 172. If the character of the work will permit, depression of the treadle will be continued, which will, after an interval during which the stud 236 is moving to the lower part of the slot in the arm 235, cause the inter-engagement of the high speed pulley 174 with the cone clutch member 186, thereby increasing the speed of the shaft 164 to that of the high speed pulley 174 or if conditons require it, the pressure upon the control treadle may be partially released to slip the clutch 221, 222 to reduce the speed of the shaft somewhat. At any time that the clutch 221, 222 is released, the shaft will rapidly slow down to the speed of the slow speed pulley 172, due to the constant braking action of the friction brake 168. When it is desired to stop the machine, the pressure upon the control treadle will be entirely released, whereupon the rod 200 will be elevated by the spring 202 and raised to the position illustrated in Fig. 1, thereby first to engage the wedge 198 and withdraw the clutch pin 194 from engagement with that one of the pins 190 with which it is engaged and then to strike the notch 201 on the wedge, and positively stop the machine in a predetermined position with respect to its cycle of operations, the latch pin 210 engaging the opposite side of the rod 200 and locking the machine against rebound. (See Fig. 5.) After the clutch pin 194 has been disconnected and before the notch 201 finally strikes the rod 200, as just described, the shaft will have been further decelerated from its slow speed by the constant braking action of the friction brake 168.

Having thus described the invention, what I claim as new and desire to secure by Letters Patent of the United States is:

1. In a starting and stopping mechanism, a machine drive shaft, a pulley rotatable about said shaft, a clutch ring mounted to turn freely upon said shaft, means for connecting the pulley to the clutch ring to drive the clutch ring at the speed of the pulley, means for positively connecting said ring to said shaft at the will of the operator to drive the shaft at the speed of said pulley, and additional means to drive the ring and the shaft at a speed higher than that of said pulley and cause the ring and the shaft both to overrun the pulley.

2. In a starting and stopping mechanism, a machine drive shaft, a slow speed pulley rotatable about said shaft, a higher speed pulley rotatable about said shaft, a clutch ring mounted to turn freely upon said shaft adjacent to said pulleys, means for automatically connecting the slow speed pulley to the clutch ring to drive the clutch ring at the speed of the slow speed pulley, means for positively connecting said ring and its connected slow speed pulley to said shaft at the will of the operator, and operator controlled means for clutching the other pulley to the clutch ring to drive the ring and the shaft at a speed higher than that given to it by the slow speed pulley and cause the ring and the shaft both to overrun the slow speed pulley.

3. In a starting and stopping mechanism, a machine drive shaft, a plurality of pulleys for said shaft, operating at different speeds, means comprising a pin clutch for positively connecting one of said pulleys to the shaft, means for connecting the other pulley to the shaft, an operator-controlled treadle for controlling said means to effect the connection of said pulleys to the shaft successively upon progressive operation of said treadle and reversely to disconnect them and stop the shaft, and a latch cooperating with the pin clutch to lock the shaft against rebound.

4. In a starting and stopping mechanism, a machine drive shaft, a relatively high speed pulley and a slower speed pulley both mounted upon said shaft, a clutch ring freely rotatable upon said shaft within said pulleys, a pin clutch for positively connecting the clutch ring to the shaft constructed and arranged to stop the shaft at a predetermined point when the clutch is released, a friction clutch interposed between the high speed pulley and the clutch ring, an operator-controlled treadle for said pin clutch constructed and arranged to bring the friction clutch into engagement after the pin clutch has been brought into engagement, and an over-running clutch interposed between the slow speed pulley and the clutch ring, said over-running clutch automatically clutching the slow speed pulley to the clutch ring to drive the shaft at the speed of the slow speed pulley and being automatically unclutched when the ring and shaft are being driven at a higher speed.

5. In a starting and stopping mechanism, a machine drive shaft, a slow speed pulley, a higher speed pulley, an operator-controlled means for connecting said pulleys successively to the shaft to drive it at a slow speed and then at a higher speed, said means operating to disconnect the pulleys in the reverse order, and continuously acting friction means for decelerating the shaft as soon as any driving power is disconnected therefrom.

6. In a starting and stopping mechanism, a machine drive shaft, a slow speed pulley, a pin clutch for connecting it to the shaft, a higher speed pulley, means including a friction clutch for connecting the latter pulley to the shaft, means for operating the clutches successively to drive the shaft at a slow speed and then at a higher speed, means for disconnecting the clutches in the reverse order, friction means to reduce the speed of the shaft to that of the slow speed pulley when the friction clutch is disconnected, means to stop the shaft at a definite point upon disengagement of the pin clutch, and locking means to prevent rebound upon stopping.

7. In a starting and stopping mechanism, a machine drive shaft, a slow speed pulley, a roller clutch associated with said slow speed pulley and a pin clutch through both of which clutches the slow speed pulley can be connected to drive the shaft at slow speed, a higher speed pulley, means including a friction clutch through which the latter pulley can be connected to the shaft, and means under the control of the operator for operating the pin and friction clutches successively to drive the shaft at a slow speed and then at a higher speed and for disconnecting the clutches in the reverse order, said roller clutch being automatically engaged during the slow speed drive and being automatically disengaged during the higher speed drive thereby permitting the shaft to overrun the slow speed pulley.

8. In a starting and stopping mechanism, a machine drive shaft, a slow speed pulley rotatable about said shaft, a higher speed pulley rotatable about said shaft, a pin clutch, a friction clutch, a roller clutch, means for connecting the slow speed pulley to the shaft through both the roller clutch and the pin clutch to drive the shaft at the speed of the slow speed pulley, means for connecting the high speed pulley to the shaft through both the friction clutch and the pin clutch and automatically disconnecting the roller clutch to drive the shaft at a speed higher than that of the slow speed pulley, and means for disconnecting the friction clutch and automatically reconnecting the roller clutch to return the shaft to the speed of the slow speed pulley.

9. In a starting and stopping mechanism, a machine drive shaft, a slow speed pulley rotatable about said shaft, a higher speed pulley rotatable about said shaft, a pin clutch, a friction clutch, a roller clutch, means for connecting the slow speed pulley to the shaft through both the roller clutch and the pin clutch to drive the shaft at the speed of the slow speed pulley, means for connecting the high speed pulley to the shaft through both the friction clutch and the pin clutch and automatically disconnecting the roller clutch to drive the shaft at a speed higher than that of the slow speed pulley, means for disconnecting the friction clutch and automatically reconnecting the roller clutch to return the shaft to the speed of the slow speed pulley, and means to stop the shaft at a definite point upon disengagement of the pin clutch.

PERLEY R. GLASS.